3,606,400
PIPE CONNECTOR
Vernon C. Hines, 1400 South Lipan St.,
Denver, Colo. 80223
Filed Nov. 12, 1969, Ser. No. 875,766
Int. Cl. F16l 21/00
U.S. Cl. 285—235
10 Claims

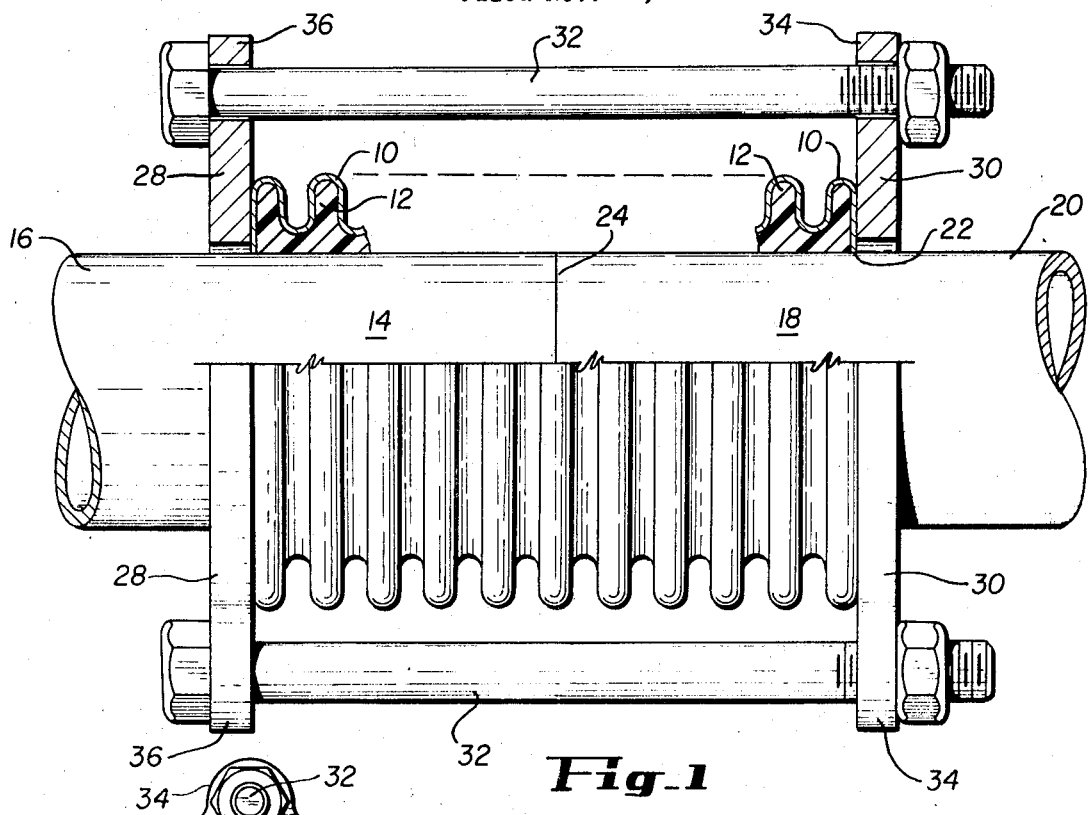
Fig. 1
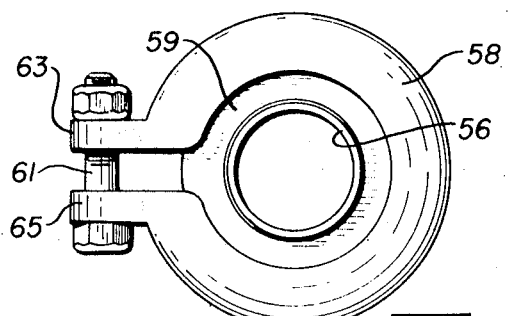
Fig. 2
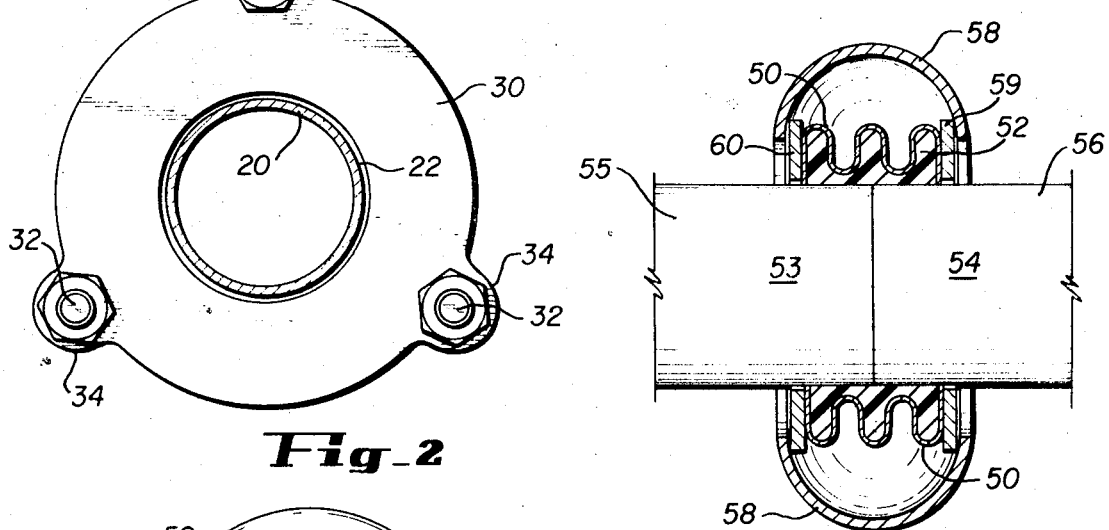
Fig. 3
Fig. 4
INVENTOR.
VERNON C. HINES
BY
Richard D. Law
ATTORNEY

United States Patent Office 3,606,400
Patented Sept. 20, 1971

ABSTRACT OF THE DISCLOSURE

A connector for the adjacent ends of pipes, tubes or the like, seals the joint between the hollow members by means of a light weight metal bellows filled with a flexible resilient material, when the flexible material is forced onto the outside of the hollow members and over the joint by compressing the ends of the bellows toward each other.

Many types of connectors, couplers, joints and the like are used to join two pieces of pipe, or other conduit tubing, together. Many such devices utilize a physical configuration change in the pipe wall at or near the joint, including such devices as threads, flanges, grooves, and the like to hold connecting member onto the pipe end and over the joint. Very few known connecting members are capable of joining two pipes without such a change in the pipe wall, and provide a connector which is capable of withstanding more than nominal pressures in the pipe (considerably below the burst pressure of the pipe). Where the pipe wall must be altered to accommodate the connector, it is generally not possible to cut into an existing piping system for the insertion of a conventional fitting for the system, since it is generally not feasible to alter the ends of the in-situ pipes, to include such devices as threads, grooves, flanges etc. for use with the standard fittings. In addition, known connecting devices join the such pipe and tubing rigidly with no accommodation for movement of the pipe due to such as thermal expansion, mechanical movements caused by hydraulic hammer, flow of fluids in the pipe, etc.

For most field operations it is desirable to have a simple connector in structure and, also one which is simple to install to provide a pressure tight joint. While some known connectors are simple to make and install they are not useful for more than very moderate pressures, and they do not permit movement while retaining the seal around the joint.

It is, therefore, among the objects and advantages of the present invention to provide a simple connector, suitable for high pressure, for connecting the plain ends pipe joints.

Another object of the invention is to provide a simple pipe connector for maintaining a seal under pressure within the movement of the pipes, tubes or the like.

A further object to the invention is to provide a connector for the joint between two ends around unaltered pipes.

A still further object to the invention is to provide a pipe connector for sealing a joint between two pipes by compressing a resilient flexible material onto the outside of the ends of both pipes and on the joint between them.

Yet another object to the invention is to provide a pipe connector which includes a flexible resilient sealing material around the pipe joint contained by a very thin metal bellows which retains the flexible material in position under compressive forces.

These and other objects and advantages of the invention may be readily ascertained by referring to the following description and appended illustrations in which:

FIG. 1 is a side elevational view of one form of the invention, showing a joint connector according to the invention; in partial cross-section mounted on a pipe joint;

FIG. 2 is an end elevational view of the connector of FIG. 1;

FIG. 3 is a side elevation, cross-sectional view of a modified form of a connector, according to the invention; and FIG. 4 is an end elevational view of a connector of FIG. 3.

In general, the pipe connector of the invention provides a thin metal bellows or convoluted metal tube which has the interior convolutes filled with a flexible resilient material covering the metal of the convolute and is arranged to telescope with a slight clearance over the ends of the two pipes. Means are provided on the ends of the bellows for compressing the bellows forcing the resilient material onto the surface of the pipe and over the joint between the pipes, forming a seal on the pipe joint which permits lateral as well as longitudinal movement of the pipe, yet retains the seal under such movement and under high pressures approaching the burst pressure of the pipe.

In the device selected for illustration, in FIGS. 1 and 2, a thin metal bellows 10, filled with a resilient flexible material 12 is telescoped over end 14 on a pipe 16 at one end and over end 18 of pipe 20 on the opposite end. The bellows or convoluted tube 10 has an aperture 22 therethrough which is slightly larger than the outside diameter of the pipes 16 and 20, so that it telescopes easily over the ends of the pipes. Preferably, the pipes have square cut ends and are moved together to form a smooth joint 24. The connector is placed approximately half way its length on each end of the pipes. A flange 28 at one end of the convoluted tube and a flange 30 at the opposite end abut the adjacent ends of the convoluted tube 10 and are reciprocable on the pipes. A series of bolt and nut arrangements 32 mounted in bolt holes in ears 36 on flange 28 and ears 34 on the flange 30 provide means for squeezing the bellows between the flanges 28 and 30. As the bellows is compressed the flexible material is pressed onto the pipe and then over the joint, and the metal bellows contains the flexible material in place.

Preferably, the metal of the convoluted tube is quite thin, and preferably it is imperforate except for the two openings at the ends of the tube. The flexible resilient material is poured or packed into the convolutes, filling the internal convolutes (extending outwardly) and covering the inside metal of the inwardly directed convolutes. This forms a flexible liner for the bellows with a smooth bore of flexible material. Preferably, the flexible resilient material is a silicone rubber or other suitable flexible material, such as rubber, rubber derivatives, resilient synthetic plastic, etc. which is capable of deformation with sufficient resiliency to return to original under moderate distortion. The silicone rubber is excellent for the purpose since it is, also, inert and impervious to most solvents and other liquids, whether inorganic or organic liquids. The convoluted metal 10 may be quite thin, mild steel, stainless steel, copper, brass, or any other metal which is suitable for the conditions under which it is to be used. Under some conditions of use, it may be desirable to coat the outside of the convolute with a flexible resilient material to protect the exterior metal from hostile conditions.

For using the connector of the invention, the ends of the pipes are preferably cut square. The exterior of the two pipes are maintained in their normal configuration without threads, grooves or the like. A square cut end on both pipes or tubes permits the tubes or pipes to be placed in abutting position. A filled convolute is then placed over the joint with the flanges in position on each end. The flanges 28 and 30 are pulled down on the convolute by means of the bolt and nut assemblies. As the convolute is compressed the inside diameter of the flexible material is somewhat reduced, being forced into contact with the outside of the pipe. The reduction of the width of the loops of the convolutes, also, squeezes the plastic towards the pipe since the metal confines the material in compression against the pipes and the joint. When pulled down upon a pipe joint, the connection is pressure proof, and the filled convolute has surprising strength. In one test, for example, a pair of pipes having a bursting pressure of about 4200 pounds per square inch were positioned adjacent each other, provided with a connector over the joint between two ends of the pipe. When pulled down, the connector remained fluid tight until its bursting pressure of about 4000 pounds. Of considerably more interest is the fact that the pipes could be moved in the connector both laterally and longitudinally. With an inch and a half pipe and a three-inch bellows the pipes were movable actually about a half an inch and were movable to some extent laterally.

In the modification shown in FIGS. 3 and 4 a three convolute metal bellows 50 is filled with a flexible resilient material 52 and is telescoped over the ends 53 and 54 of pipes 55 and 56 respectively. An axially U-shaped clamp ring 58 telescopes over the convolute tube 50, and discs 59 and 60 are pressed against the convolutes as the clamp ring 58 is closed by means of a bolt and nut assembly 61 mounted through apertures and ears 63 and 65 of the clamp ring 58. As the bolt and nut assembly is tightened on the ears 63 and 65 the ring 58 clamps down on the discs 60 and 59 compressing the bellows and forming a tight seal over the joint in the pipe.

The thin walled, convoluted tubular member may be made with the convolutes formed individually in side by side relation, or may be made as a spiral. Different types of convoluted tubes or bellows may thus be used for the connector. The wall of convoluted member must be thin enough to be compressible, but have sufficient tensile strength to contain the resilient material on compression. The thickness of the layer of the resilient material is determined by the conditions of use, however, economy usually dictate the use of a reasonably thin layer internally of the convolutes which effective forms the seal when the convolutes are compressed.

Other types of means may be used to compress the convolutes. The two means shown are simple and economical to produce. The requirement of fastening means on the convoluted tube is that means be provided to compress the convolute to form the seal on abutting tubular members in the connector.

I claim:
1. A connector for the abutting ends of two pipe members, tubing members or the like comprising an imperforate convoluted-wall tubular metal body having thin walls and having a minimum inner diameter greater than the outside diameter of the abutting members to be joined, said body being characterized by being longitudinally compressible; a flexible, resilient material filling the internal convolutions of said body and covering all metal portions internally thereof forming a generally smooth bore therethrough of a diameter slightly larger than the outside diameter of the members to be joined to permit telescoping of the members in said smooth bore; two flange plates, each having a central aperture therein of a diameter slightly larger than the outside diameter of the members to be joined to permit longitudinal movement of said plates along the members, for abutting the opposed ends of said body; and means cooperating with each said flange plate for moving said plates toward each other compressing the ends of said body towards each other and squeezing said flexible, resilient material onto the members telescoped in said body thereby reducing the diameter of said smooth bore so as to seal against the members and thereby grip and connect the same, while permitting limited movement of the members while retaining the seal thereon.

2. A connector according to claim 1 wherein a plurality of convolutions are formed in said tubular body.

3. A connector according to claim 1 wherein said tubular body extends a substantial distance on each side of the ends of the members to be joined.

4. A connector according to claim 1 wherein at least 3 convolutions are formed in said tubular body.

5. A connector according to claim 1 wherein said resilient material is relatively soft and is deformable.

6. A connector according to claim 1 wherein said resilient material is a silicone rubber.

7. A connector according to claim 1 wherein said convolutions are singly formed in side by side relation in said tubular body.

8. A connector according to claim 1 wherein said flange plates have ears extending radially beyond the outer diameter of said body with apertures formed in said ears, and said means cooperating with each flange plate is a plurality of bolt and nut assemblies connecting through aligned apertures in said ears for drawing said flange plates toward each other.

9. A connector according to claim 1 wherein said tubular body has ends which extend radially inward farther than the convolutions.

10. A connector according to claim 1 wherein said flange plates are discontinuous around the members to be joined, and said means includes an arcuate connecting member integral with said plates, surrounding the same, with extending ends and adjusting means joining said extending ends for moving the same towards each other to move said flanges together to compress said body.

References Cited

UNITED STATES PATENTS

| | | | |
|---|---|---|---|
| 2,355,440 | 8/1944 | Howard | 285—363X |
| 2,769,648 | 11/1956 | Herman | 285—366X |
| 3,068,026 | 12/1962 | McKamey | 285—363X |

DAVID J. WILLIAMOWSKY, Primary Examiner

W. L. SHEDD, Assistant Examiner

U.S. Cl. X.R.

285—369